United States Patent
Shin et al.

(10) Patent No.: US 11,030,930 B2
(45) Date of Patent: Jun. 8, 2021

(54) DISPLAY DEVICE HAVING DEFORMED DISPLAY PANEL

(71) Applicant: LG Display Co., Ltd., Seoul (KR)

(72) Inventors: HyungBeom Shin, Goyang-si (KR); JaeHyung Jo, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/224,387

(22) Filed: Dec. 18, 2018

(65) Prior Publication Data

US 2019/0206296 A1 Jul. 4, 2019

(30) Foreign Application Priority Data

Dec. 28, 2017 (KR) .......................... 10-2017-0183166

(51) Int. Cl.
- *G09G 3/20* (2006.01)
- *G02F 1/1343* (2006.01)
- *G02F 1/1333* (2006.01)

(52) U.S. Cl.
CPC ......... *G09G 3/20* (2013.01); *G02F 1/134363* (2013.01); *G02F 1/133388* (2021.01); *G02F 1/134318* (2021.01); *G02F 2201/56* (2013.01); *G09G 2300/0426* (2013.01); *G09G 2300/0439* (2013.01); *G09G 2380/02* (2013.01)

(58) Field of Classification Search
CPC ... G02F 1/134363; G02F 2001/133388; G02F 2001/134318; G02F 2201/56; G09G 3/20; G09G 2300/0426; G09G 2300/0439; G09G 2380/02
See application file for complete search history.

(56) References Cited

U.S. PATENT DOCUMENTS

| | | | |
|---|---|---|---|
| 10,409,103 B2* | 9/2019 | Katsuta | G02F 1/133512 |
| 2005/0259210 A1* | 11/2005 | Lee | G02F 1/134363 349/156 |
| 2008/0179595 A1* | 7/2008 | Song | G02F 1/134363 257/59 |
| 2010/0214195 A1 | 8/2010 | Ogasawara et al. | |
| 2010/0289994 A1 | 11/2010 | Nonaka | |
| 2016/0291376 A1 | 10/2016 | Iwatsu et al. | |
| 2017/0278906 A1* | 9/2017 | Song | H01L 27/326 |
| 2017/0322446 A1 | 11/2017 | Tae et al. | |
| 2018/0130397 A1* | 5/2018 | Zheng | G09G 3/207 |

FOREIGN PATENT DOCUMENTS

| | | |
|---|---|---|
| CN | 101849255 A | 9/2010 |
| CN | 101887189 A | 11/2010 |
| CN | 103513478 A | 1/2014 |
| CN | 105629596 A | 6/2016 |

(Continued)

*Primary Examiner* — Kwang-Su Yang
(74) *Attorney, Agent, or Firm* — Seed IP Law Group LLP

(57) ABSTRACT

A display device may comprise a substrate which includes a display area including a first pixel and a non-display area including a second pixel, a first data line which is disposed on the substrate and applies a data signal to the first pixel, a second data line which is disposed on the substrate and applies a data signal to the second pixel and a gate line which is disposed on the substrate and applies gate signals to the first pixel and the second pixel at the same timing, wherein the first pixel and the second pixel have different area from each other.

17 Claims, 6 Drawing Sheets

(56) References Cited

FOREIGN PATENT DOCUMENTS

| CN | 106019753 A | 10/2016 |
|---|---|---|
| CN | 107357073 A | 11/2017 |
| CN | 107479269 A | 12/2017 |
| CN | 107481620 A | 12/2017 |
| KR | 10-2004-0047400 A | 6/2004 |
| KR | 10-0919634 B1 | 9/2009 |
| WO | 2017/133180 A1 | 8/2017 |

* cited by examiner

DISPLAY DEVICE HAVING DEFORMED DISPLAY PANEL

CROSS-REFERENCE TO RELATED APPLICATIONS

This application claims the priority of Korean Patent Application No. 10-2017-0183166 filed on Dec. 28, 2017, in the Korean Intellectual Property Office, the disclosure of which is incorporated herein by reference.

BACKGROUND

Technical Field

The present disclosure relates to a display device, and more particularly, to a display device having a deformed display panel.

Description of the Related Art

Various display devices are currently being developed and marketed. For example, there are display devices such as a liquid crystal display device (LCD), a field emission display device (FED), an electro-wetting display device (EWD), an organic light emitting display device (OLED), and a quantum dot display device (QD).

A display device includes a display area in which a plurality of pixels is disposed to implement images and a non-display area which encloses the display area. In the non-display area, images are not implemented. In this case, in the display area, a plurality of pixels may be defined. Further, in the non-display area, wiring lines and circuits for transmitting various signals to the plurality of pixels are disposed.

As the technology for implementing such a display device has been developed and a large number of products have been mass-produced, technologies for implementing a design desired by a consumer have been mainly developed for the display device. One of them is diversification of a shape of a display panel. Specifically, the display panel is required to have various shapes, such as a triangle, a pentagon, a hexagon, and a circle, which are deviated from the rectangular shape.

BRIEF SUMMARY

An object to be achieved by the present disclosure is to provide a display device in which a design of pixels disposed in a non-display area among pixels disposed in a display panel is changed to ensure a driving area of the non-display area without enlarging the non-display area.

Another object to be achieved by the present disclosure is to provide a display device in which an opening area is increased by changing shapes of some electrodes of the pixels disposed in an area overlapping a boundary line between a display area and a non-display area and pixels disposed in the non-display area.

According to an aspect of the present disclosure, the display device includes: a substrate which includes a display area including a first pixel and a non-display area including a second pixel, a first data line which is disposed on the substrate and applies a data signal to the first pixel, a second data line which is disposed on the substrate and applies a data signal to the second pixel, and a gate line which is disposed on the substrate and applies gate signals to the first pixel and the second pixel at the same timing, wherein the first pixel and the second pixel are different area from each other. In the display device according to the exemplary embodiment of the present disclosure, some of the pixel electrodes or the common electrodes disposed in the second pixel are not present to have a different area from the first pixel so that an area where the driving elements are disposed in the non-display area may be increased.

According to another aspect of the present disclosure, the display device includes a substrate in which a boundary line defining a display area and a non-display area surrounding the display area, a first pixel disposed in the display area, a bent portion defined at a center portion of the first pixel, and a second pixel disposed in the non-display area, in which the second pixel includes an upper area and a lower area which are defined with respect to the bent portion and the upper area and the lower area of the second pixel have different widths.

According to the present disclosure, some of driving electrodes which configure a pixel disposed at an outermost periphery of a display panel are not present to ensure a driving area of the non-display area without enlarging the non-display area in a deformed display panel.

According to the present disclosure, a shape of pixels disposed in the non-display area and pixels disposed in an area overlapping a boundary line between the display area and the non-display area and a shape of some electrodes disposed in the pixel are changed so that an opening area may be increased while minimizing a margin of the non-display area, thereby increasing an opening area of the display device.

The effects according to the present disclosure are not limited by the contents exemplified above, and more various effects are included in the specification.

BRIEF DESCRIPTION OF THE SEVERAL VIEWS OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
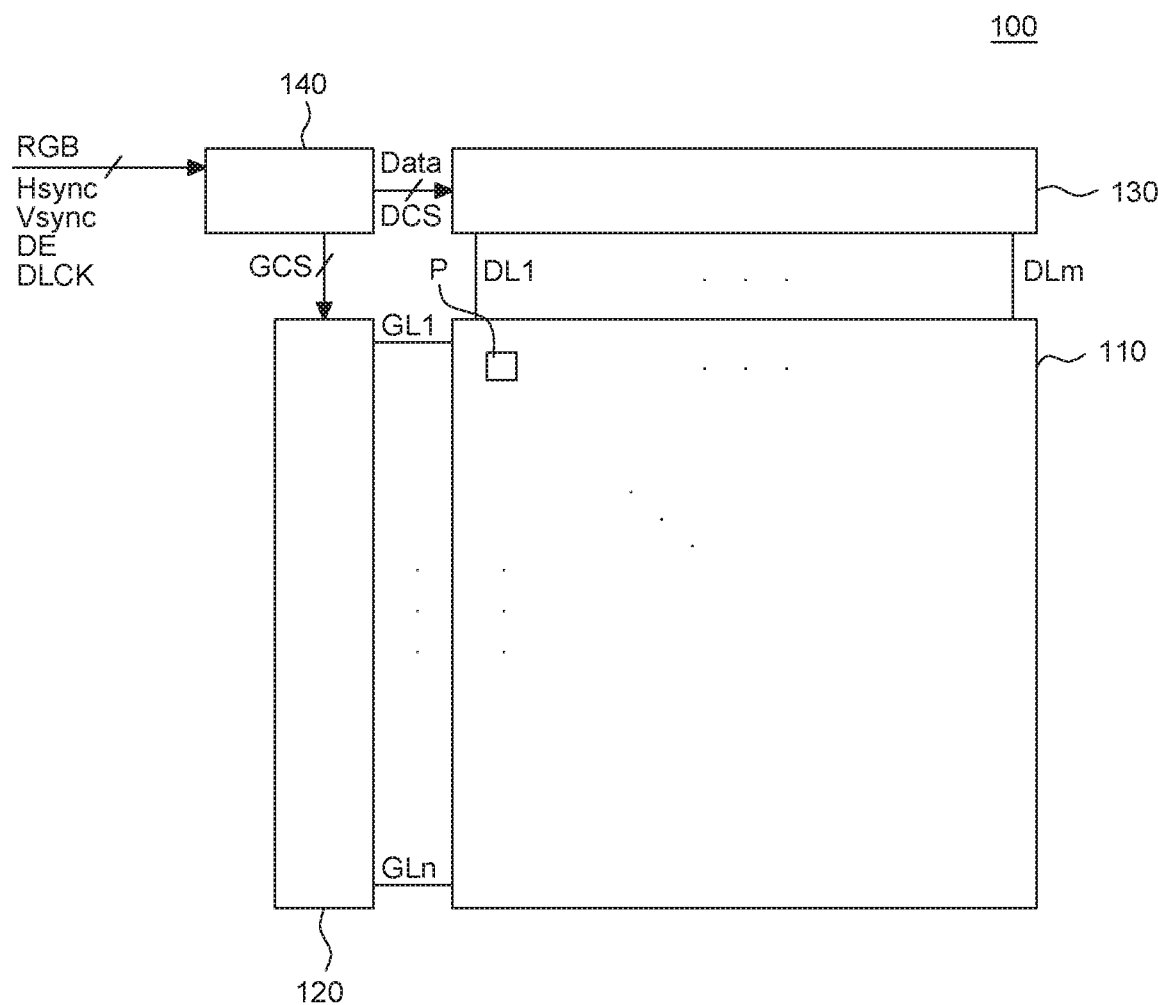
FIG. 1 is a block diagram illustrating a display device according to an exemplary embodiment of the present disclosure.

Advantages and characteristics of the present disclosure and a method of achieving the advantages and characteristics will be clear by referring to the embodiments described below in detail together with the accompanying drawings. However, the present disclosure is not limited to the embodiment disclosed herein but will be implemented in various forms. The embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the various embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "comprising" used herein are generally intended to allow other components to be added unless the terms are used with the term "only." Any references to singular may include plural unless expressly stated otherwise.

Components are interpreted to include an ordinary error range even if not expressly stated.

When the position relation between two parts is described using the terms such as "on," "above," "below," and "next," one or more parts may be positioned between the two parts unless the terms are used with the term "immediately" or "directly." It is to be understood that an element or layer is referred to as being "on" another element or layer, including either intervening layers or other elements directly on or in between. When an element is described as being "connected," "coupled," or "connected" to another element, the element may be directly connected or connected to the other element. However, it should be understood that other elements may be "interposed" between each element, or each element may be "connected," "coupled," or "connected" through another element.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Like reference numerals refer to like elements throughout the specification.

The sizes and thicknesses of the individual components shown in the drawings are shown merely for convenience of explanation and the present disclosure is not necessarily limited to the size and thickness of the components shown in the drawings.

Each of the features of the various embodiments of the present disclosure can be combined or combined with each other partly or entirely. The features of the various embodiments can be technically interlocked and driven as well. The features of the various embodiments can be practiced independently or in conjunction with each other independently of each other.

Hereinafter, the present disclosure will be described with reference to the accompanying drawings.

Figure 2:
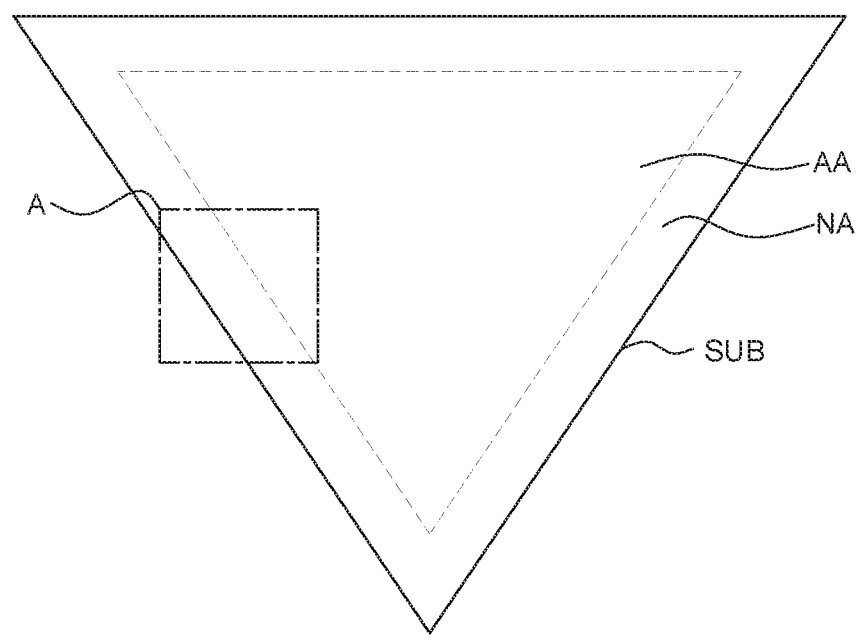
FIG. 2 is a plan view illustrating a display panel of FIG. 1.

FIG. 1 is a block diagram illustrating a display device according to an exemplary embodiment of the present disclosure. FIG. 2 is a plan view illustrating a display panel of FIG. 1.

Referring to FIG. 1, a display device 100 according to an exemplary embodiment of the present disclosure includes a display panel 110, a gate driver 120, a data driver 130, and a timing controller 140.

The display panel 110 includes n gate lines GL1 to GLn disposed in a first direction, m data lines DL1 to DLm disposed in a second direction different from the first direction, and a plurality of pixels P which are electrically connected to the n gate lines GL1 to GLn and the m data lines DL1 to DLm. The plurality of pixels P displays images by a driving signal or a driving voltage applied through the gate lines GL1 to GLn and the data lines DL1 to DLm.

The display panel 110 according to the exemplary embodiment of the present disclosure may have a triangular shape, as illustrated in FIG. 2. The display panel 110 includes a substrate SUB, a display area AA which is disposed on the substrate SUB and displays images and a non-display area NA which is adjacent to the display area AA. In FIG. 2, a display panel having a triangular shape is described as an example, but it is not limited thereto. In other words, the display panel 110 according to the exemplary embodiment of the present disclosure, as illustrated in FIG. 2, may be applied to a display panel 110 including any one side in which a boundary line of the display area AA and the non-display area NA is disposed an oblique direction. That is, the display panel 110 may have various shapes such as a pentagon or a hexagon, rather than the triangle.

The display area AA is an area in which an image is displayed in the display device 100 and a display element and various driving elements for driving the display element are disposed in the display area AA. Specifically, pixels P disposed at an outermost periphery of the display area AA may have a different shape from other pixels P disposed in the display area AA. Here, the pixels disposed at an outermost periphery of the display area AA may be pixels disposed in an area overlapping the boundary line of the display area AA and the non-display area NA. More specifically, in order to allow the display area AA to have a constant capacitance, an upper width and a lower width of the pixel P disposed at the outermost periphery of the display area AA may be different from each other. Further, in order to suppress an opening area from being reduced due to the difference between the upper width and the lower width, a shape of a pixel driving electrode of the pixel P disposed at the outermost periphery of the display area AA may be changed.

The non-display area NA is adjacent to the display are AA. More specifically, the non-display area NA is adjacent to the display area AA to enclose the display area AA. In the non-display area NA, no image is displayed and lines or circuit units are disposed. For example, an anti-static element, a signal pad, and a signal link line may be disposed.

In the non-display area NA, a row of pixels P disposed in the display area AA extends so that the pixels P may be disposed. That is, the display panel 110 according to the exemplary embodiment of the present disclosure has a deformed shape, so that the pixels P may be disposed in the non-display area NA. The pixels P disposed in the non-display area NA may have different areas from the pixel disposed in the display area AA. That is, when the pixel disposed in the display area AA is a first pixel and a pixel disposed in the non-display area NA is a second pixel, the second pixel has a different area from the first pixel. This is because the pixel driving electrodes disposed in the second pixel, that is, some components of the pixel electrode and the common electrode are not present. In the area not present as described above, driving elements such as an anti-static element, a signal pad, and a signal link line may be disposed. Therefore, in the display panel 110 according to the exemplary embodiment of the present disclosure, the display panel 110 has a deformed shape so that a limited area of the non-display area NA may be increased. That is, according to the present disclosure, a part of an area of a pixel disposed in the non-display area NA is removed without separately increasing a width of the non-display area NA so that an area where the anti-static element, the signal pad, and the signal link line are disposed in the non-display area NA may be increased. Therefore, in order to solve the problem caused when some configurations of the second pixel which is a pixel P disposed in the non-display area NA are not present, a width of a first area of the pixel, which is an upper area and a width of a second area of the pixel, which is a lower area are formed to be different. Further, in order to increase an opening area of the other area, a pixel electrode and a common electrode having different shapes may be disposed.

The gate driver 120 supplies gate signals to the pixels P disposed on the display panel 110 in accordance with a gate driving control signal GCS transmitted from the timing controller 140. The gate driver 120 may include a shift register and a level shifter. The gate driver 120 may be embedded on the non-display area NA where the pixels P are not disposed by a gate in panel (GIP) manner as a thin film type at the time of manufacturing the display panel 110 or may be disposed independently from the display panel 110.

The data driver 130 generates a sampling signal by a data driving control signal DCS transmitted from the timing controller 140 and changes the image data into a data signal by latching image data input from the timing controller 140 in accordance with the sampling signal, and then supplies the data signal DS to the pixels disposed on the display panel 110 in response to a source output enable (SOE) signal. The data driver 130 may be disposed by any one of a chip on film (COF) method, a chip on glass (COG) method, and a method of integrating the data driver in the display panel 110 to be disposed.

The timing controller 140 transmits an input image signal RGB received from a host system to the data driver 130. The timing controller 140 generates a timing control signal for controlling operation timings of the gate driver 120 and the data driver 130 using timing signals such as a clock signal DCLK, a horizontal synchronization signal Hsync, a vertical synchronization signal Vsync, and a data enable signal DE which are received together with the input image signal RGB. The timing controller 140 is synchronized with the timing control signal to generate a control signal DCS of the data driver 130 and a control signal GCS of the gate driver 120.

As described above, when the display panel 110 has a deformed shape, that is, when the boundary line of the display area AA and the non-display area NA is disposed an oblique direction, a general pixel arrangement in the display panel 110 will be described below.

Figure 3:
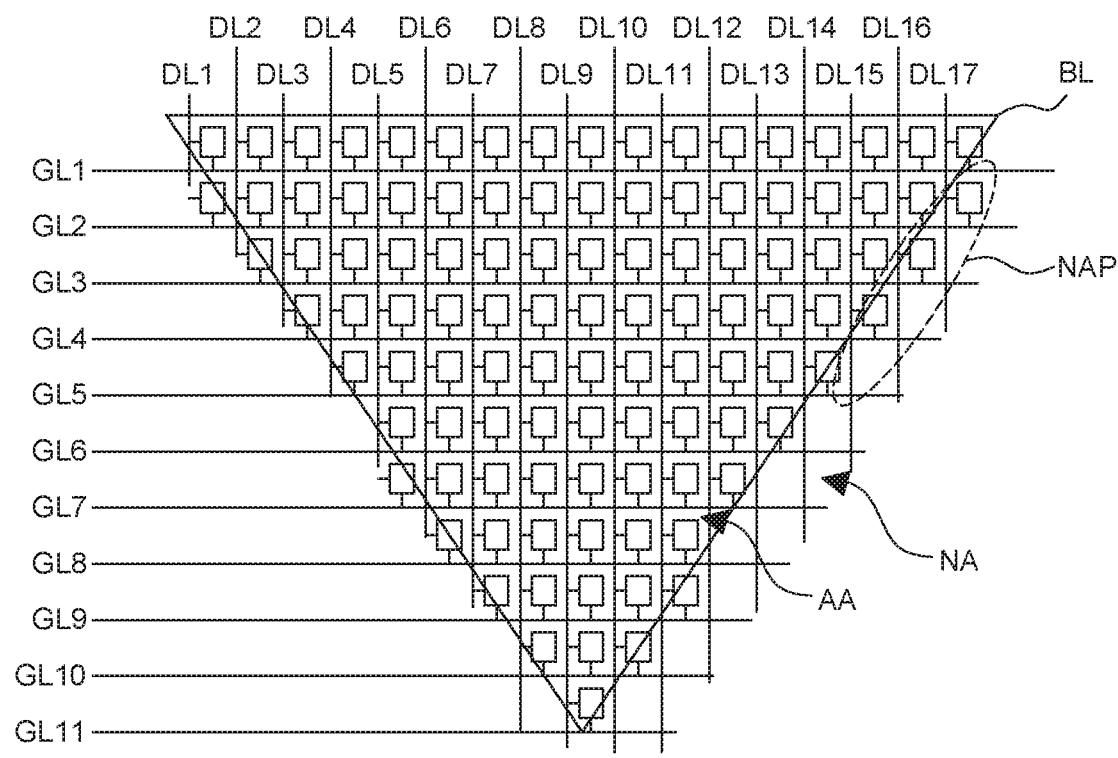
FIG. 3 is a plan view for explaining a general pixel arrangement in a display panel of FIG. 1.

FIG. 3 is a plan view for explaining a general pixel arrangement in a display panel of FIG. 1.

Referring to FIG. 3, in the display panel 110 in which the boundary line BL of the display area AA and the non-display area NA is disposed an oblique direction, similarly to the triangle, a plurality of gate lines GL1 to GL11 is disposed in a first direction, a plurality of data lines DL1 to DL17 is disposed in a second direction different from the first direction, and a plurality of pixels P which are electrically connected to the plurality of gate lines GL1 to GL11 and the plurality of data lines DL1 to DL17 is disposed. In this case, in the display panel 110 in which the boundary line BL of the display area AA and the non-display area NA is disposed an oblique direction, that is, in the display panel 110 having a deformed shape, a shape of each pixel P is changed in accordance with the boundary line BL. Therefore, as illustrated in FIG. 3, some pixels NAP are disposed to overlap the boundary line BL or extend to an adjacent non-display area NA.

As described above, the pixels NAP disposed in the non-display area NA with respect to the boundary line BL may result in reduction of an area of the non-display area where lines and circuit units, such as an electrostatic element or a power line, are disposed.

Therefore, the present disclosure provides a structure and method for solving the above-mentioned problem.

Figure 4:
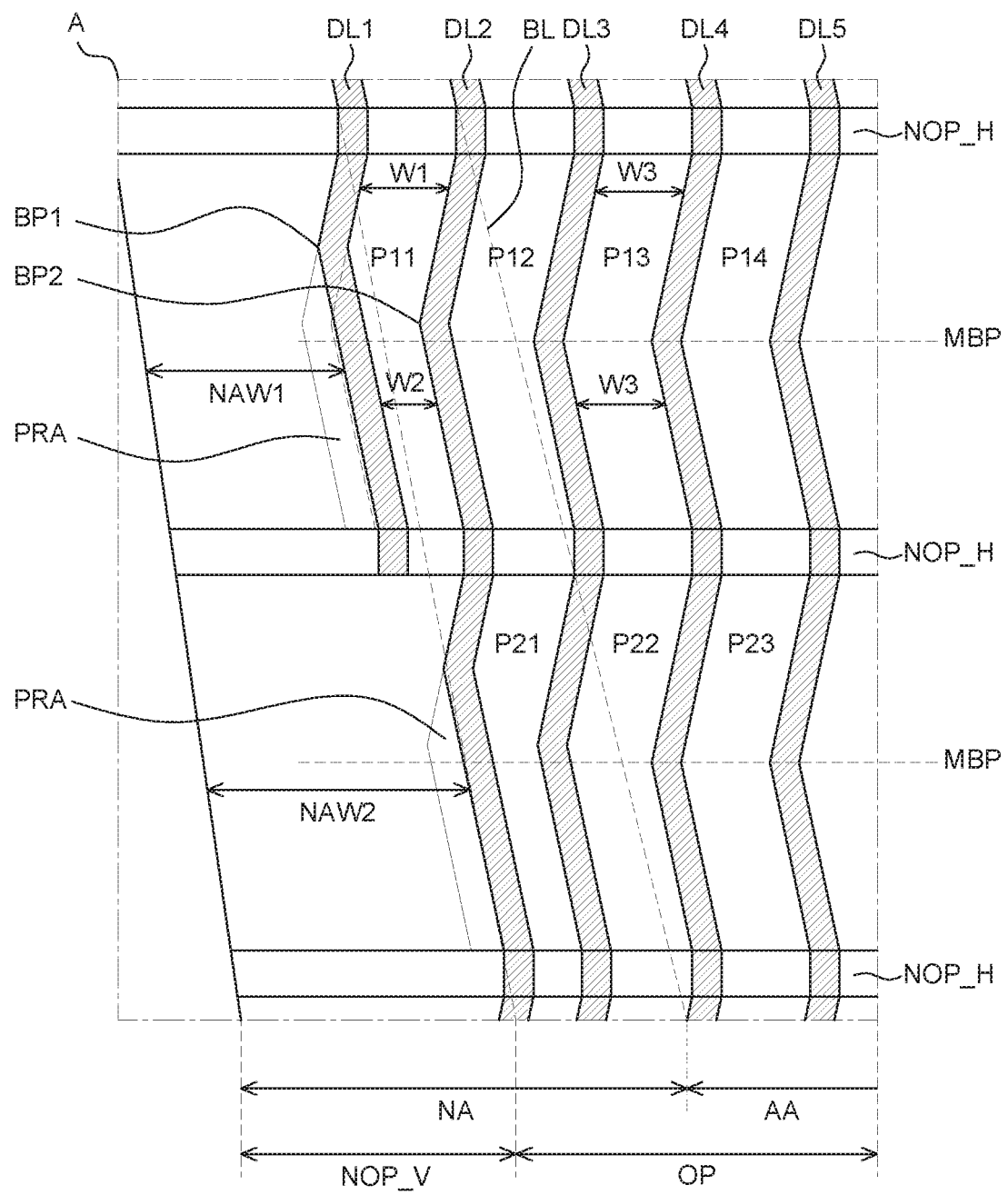
FIG. 4 is an enlarged view of an A area in a display panel of FIG. 2.

FIG. 4 is an enlarged view of an A area in a display panel of FIG. 2.

Referring to FIG. 4, in a display panel 110 according to an exemplary embodiment of the present disclosure, a display area AA and a non-display area NA are defined with respect to a boundary line BL. The boundary line BL may be disposed an oblique direction corresponding to at least one side of the display panel 110 because the display panel 110 has a specific shape, for example, an inverted triangle shape.

In the display area AA and a part of the non-display area NA adjacent to the boundary line BL, a plurality of pixels P11, P12, P13, P14, P21, P22, and P23 are disposed. Specifically, as illustrated in FIG. 4, in the display panel 110 having an inverted triangle shape as described in the exemplary embodiment of the present disclosure, the number of pixels P which are disposed in each row of the first direction may be gradually decreased toward a vertex direction of the triangle, that is, the second direction. For example, referring to FIG. 4, in a first row of FIG. 4, a first-first pixel P11, a first-second P12, a first-third pixel P13, and a first-fourth pixel P14 are disposed and in a second row, a second-first pixel P21, a second-second P22, and a second-third pixel P23 are disposed. Here, the first-first pixel P11, the first-second P12, the first-third pixel P13, and the first-fourth pixel P14 are connected to different data lines DL and connected to the same gate line disposed in a non-opening area NOP-H of the first row. Further, the second-first pixel P21, the second-second P22, and the second-third pixel P23 are connected to different data lines DL and connected to the same gate line disposed in a non-opening area NOP-H of the second row. (As can be understood from this text, for each particular pixel, the first word and number listed is the row of that pixel and the second word and number listed is the column of that pixel in the array as a whole.)

In the display panel 110 according to the exemplary embodiment of the present disclosure, pixels disposed in the display area AA may have different areas from pixels which overlap the boundary line BL or are disposed in the non-display area NA. Referring to FIG. 4, areas of the first-first pixel P11 disposed at the outermost periphery of the first row, that is, in the non-display area NA, the second-first pixel P21 disposed at the outermost periphery of the second row, and the first-second pixel P12 and the second-second pixel P22 which overlap the boundary line BL may be different from areas of the pixels disposed in the display area AA, that is, the first-third pixel P13, the first-fourth pixel P14, and the second-third pixel P23. More specifically, pixels disposed in the non-display area NA, for example, the first-first pixel P11 and the second-first pixel P21 may be smaller than the pixels disposed in the display area AA, for example, the first-third pixel P13, the first-fourth pixel P14, and the second-third pixel P23. Further, pixels which overlap the boundary line BL, for example, the first-second pixel P12 and the second-second pixel P22 may be smaller than the pixels disposed in the display area AA, for example, the first-third pixel P13, the first-fourth pixel P14, and the second-third pixel P23. Further, the pixels disposed at the outermost periphery of the pixel rows where the pixels are disposed, for example, the first-first pixel P11 and the second-first pixel P21 may be the smallest among the pixels disposed in the corresponding row.

For example, the first-first pixel P11 which is disposed at the outermost periphery of the first row and in the non-display area NA may be smaller than the first-third pixel P13 disposed in the display area AA. This is because some pixel electrodes and common electrodes among a plurality of pixel electrodes and a plurality of common electrodes disposed in the first-first pixel P11 are not present. Since some of the pixel circuit elements and structures are not present, an area is create that does not contain any part of the pixel, called a pixel electrode removed area PRA. This PRA is obtained by removing or in some embodiments, not creating at all some pixel electrodes and common electrodes. In the pixel electrode removed area PRA, various structures and circuit elements that are part non-display circuits may be placed in these locations, for example, the electrostatic element, the signal link line or other elements that are disposed in the non-display area NA may be disposed in PRA. Therefore, in the display device 100 according to the exemplary embodiment of the present disclosure, some of the pixel electrodes and the common electrodes of the pixels P11 and P21 disposed in the non-display area NA are not present so that an area PRA is created where elements to be disposed in the non-display area NA are further disposed may be ensured without enlarging the non-display area NA.

That is in an area where the driving elements disposed in the non-display area NA in the first row may be disposed may have only a width of the non-display area NA of the first row of the related art and the area where the driving elements are disposed in the non-display area NA in the second row may have only a width of the non-display area NA of the second row of the related art, thus this area in the related art is limited by the full pixel being present in these rows. In the display device 100 according to the exemplary embodiment of the present disclosure as shown in FIG. 4, the area where the driving elements may be included may have a first width NAW1 obtained by adding a width to the non-display area NA this is length of the first column by the width of the pixel electrode removed area PRA in the first row. Similarly, and a second width NAW2 is obtained by adding to width of the non-display area NA and area of the length of the first column by a width of the pixel electrode removed area PRA in the second row. Therefore, the non-display area NA may be increased, yet without loss of pixel area that is used to emit light. Further, the first-first pixel P11 and the second-first pixel P21 disposed in the non-display area NA may have a first area and a second area and the first area and the second area may have different widths. Here, the first area may be an upper area of the first-first pixel P11 with respect to a main bent portion MBP and the second area may be a lower area of the first-first pixel P11 with respect to the main bent portion MBP. Here, the main bent portion MBP may be a center portion of each pixel row. The location of MBP is location in the main pixel area at which the data line bends to change its angle. It could also be referred to as the main bending point, namely, the point of the bend of the majority of the data lines in the pixel array. For example, as illustrated in FIG. 4, when the upper area of the first-first pixel P11 has a first-pixel width W1, the lower area may have a second-pixel width W2 which is different from the first-pixel width. In this case, the first-pixel width W1 may be larger than the second-pixel width W2. Further, the first-pixel width W1 may be equal to or smaller than a third-pixel width W3 of the first-third pixel P13 disposed in the display area AA and the second-pixel width W2 may be smaller than the third-pixel width W3 of the first-third pixel P13 disposed in the display area AA. As described above, the display device 100 according to the exemplary embodiment of the present disclosure is formed such that the upper area and the lower area have different widths in the pixel, for example, in the first-first pixel P11. Therefore, the number of pixel electrodes and the number of common electrodes disposed in the upper area and the lower area may be different from each other. That is, in the first-first pixel P11, since the first-pixel width W1 of the upper area is larger than the second-pixel width W2 of the lower area, the number of pixel electrodes and common electrodes disposed in the upper area may be larger than the number of pixel electrodes and common electrodes disposed in the lower area. In an upper area having a larger width of the first-first pixel P11, pixel electrodes and common electrodes having different lengths from the pixel electrode and the common electrode disposed in the first-first pixel P11 may be disposed. A detailed structure of the pixel will be described in more detail with reference to FIG. 5.

Further, the first-first pixel P11 may be applied with a data signal from the first data line DL1, the first-second pixel P12 may be applied with a data signal from the second data line DL2, the first-third pixel P13 may be applied with a data signal from the third data line DL3, and the first-fourth pixel P14 may be applied with a data signal from the fourth data line DL4. In this case, the first-first pixel P11, the first-second pixel P12, the first-third pixel P13, and the first-fourth pixel P14 may be applied with the gate signal by the same gate line disposed in a horizontal non-opening area NOP-H.

Figure 5:
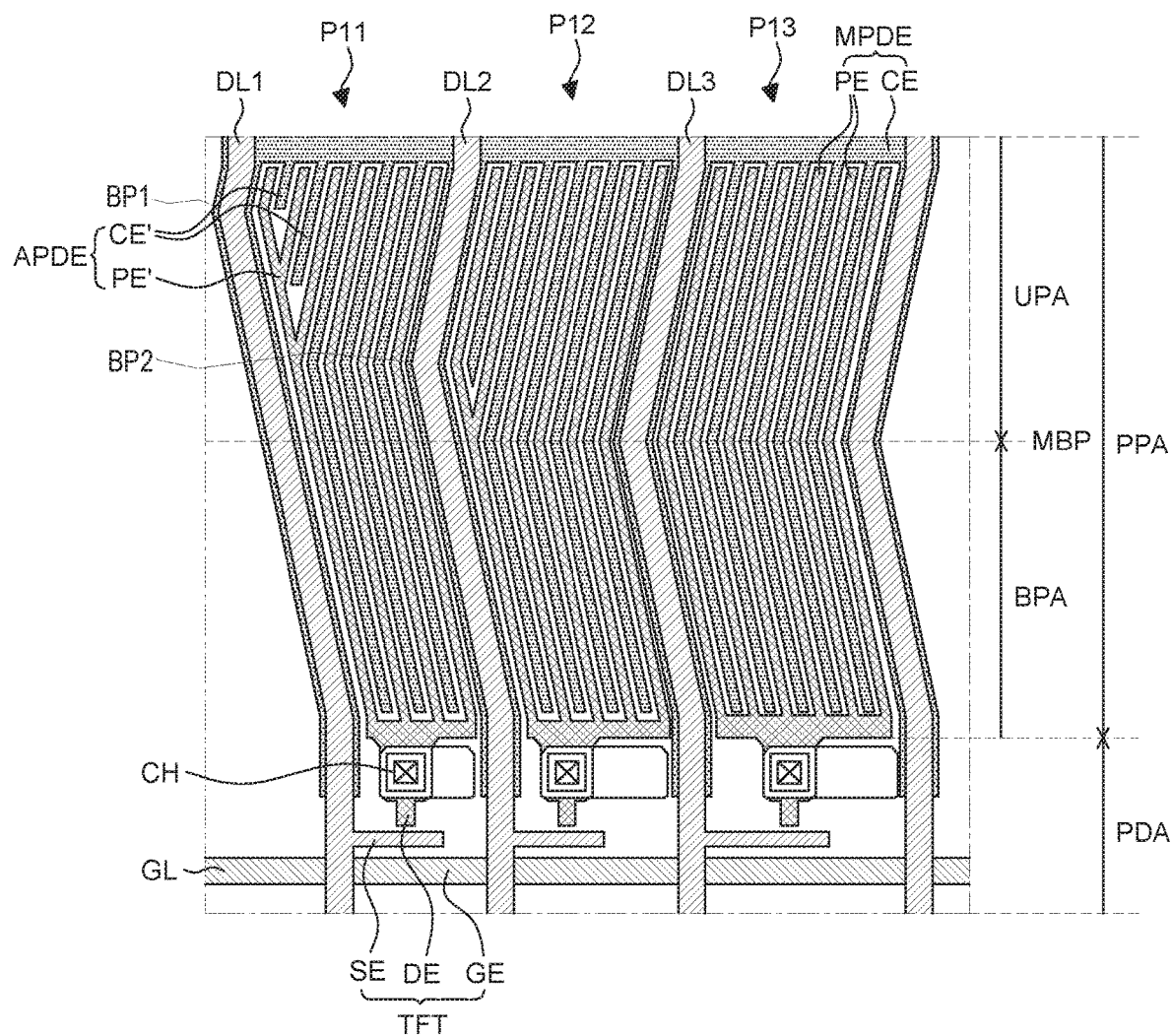
FIG. 5 is a plan view illustrating a detailed pixel structure of a partial area of FIG. 4.

The first data line DL1, the second data line DL2, the third data line DL3, and the fourth data line DL4 which are connected to the first-first pixel P11, the first-second pixel P12, the first-third pixel P13, and the first-fourth pixel P14, respectively, may have bent portions which protrude in a first direction. In this case, the bent portion of the first data line DL1 connected to the first-first pixel P11 disposed in the non-display area NA, the bent portion of the second data line DL2 connected to the first-second pixel P12 disposed in an area overlapping the boundary line BL, and the bent portions of the third data line DL3 connected to the first-third pixel P13 and the fourth data line DL4 connected to the first-fourth pixel P14 disposed in the display area AA may be disposed in different positions. For example, as illustrated in FIG. 4, the first data line DL1 has a first bent point BP1, the second data line DL2 has a second bent points BP2, and the third and fourth data lines DL3 and DL4 may have main bent point MBP and the bent portions may be disposed in different positions. In this case, the main bent point MBP may be disposed in a center portion of a pixel area. In the meantime, the first bent point BP1 may be disposed to be higher than the main bent portion MBP and the second bent point BP2 may be disposed to be higher than the main bent portion MBP and lower than the first bent point BP1. Therefore, the main bent portions MBP of the third data line DL3 and the fourth data line DL4 connected to the first-third pixel P13 and the first-fourth pixel P14 disposed in the display area AA may be disposed to be lower than the first bent point BP1 of the first data line DL1 connected to the first-first pixel P11 disposed in the non-display area NA and the second bent point BP2 of the second data line DL2 connected to the first-second pixel P12 which overlaps the boundary line BL. As can be seen in FIGS. 4 and 5, the bending points for the pixels P11 and P12 are not located at the same place as the main bending point for the pixels in the array. Since the bending point is higher in the pixel, the area occupied by the pixel is less because the data line slopes outward for a shorter distance and inward for a greater distance.

Detailed structures of the first-first pixel P11 disposed in the non-display area NA, the first-second pixel P12 in an area overlapping the boundary line BL, and the first-third pixel P13 disposed in the display area AA will be described with reference to FIG. 5.

FIG. 5 is a plan view illustrating a detailed pixel structure of a partial area of FIG. 4.

Referring to FIG. 5, in the display panel 110, the first-first pixel P11, the first-second pixel P12, and the first-third pixel P13 are disposed. The first-first pixel P11 may be a pixel disposed in the non-display area NA, the first-second pixel P12 may be a pixel disposed in an area overlapping the boundary line BL which defines the display area AA and the non-display area NA, and the first-third pixel P13 may be a pixel disposed in the display area AA. In each of the first-first pixel P11, the first-second pixel P12, and the first-third pixel P13, a pixel area PPA where the plurality of pixel electrodes PE and the plurality of common electrodes CE are disposed and a pixel driving area PDA which drives the plurality of pixel electrodes PE and the plurality of common electrodes disposed in the pixel area PPA may be disposed. In the pixel area PPA, the plurality of common electrodes CE and the plurality of pixel electrodes PE are alternately disposed and in the pixel driving area PDA, a thin film transistor TFT including a gate electrode GE which is a gate line GL, a source electrode SE, and a drain electrode DE may be disposed. The pixel electrode PE disposed in the pixel area PPA may be electrically connected to the thin film transistor TFT disposed in the pixel driving area PDA by a contact hole CH.

The first-first pixel P11, the first-second pixel P12, and the first-third pixel P13 may have a first area UPA which is an upper area with respect to the main bent portion MBP and a second area BPA which is a lower area. In the first-first area P11 and the first-second pixel P12, the number of pixel electrodes PE and common electrodes CE disposed in the first area UPA may be different from the number of pixel electrodes PE and common electrodes CE disposed in the second area BPA. First, in the first-first pixel P11, when the number of pixel electrodes PE disposed in the first area UPA of the first-first pixel P11 is five, the number of pixel electrodes PE disposed in the second area BPA of the first-first pixel P11 may be three. Further, in the first-second pixel P12, when the number of pixel electrodes PE disposed in the first area UPA of the first-second pixel P12 is five, the number of pixel electrodes PE disposed in the second area BPA of the first-second pixel P12 may be four. This is caused because the width of the first area UPA and the width of the second area BPA of the first-first pixel P11 disposed in the non-display area NA are different from the width of the first area UPA and the width of the second area BPA of the first-second pixel P12 disposed in the area overlapping the boundary line BL. The widths may be different because some of the pixel electrodes PE and the common electrodes CE of the first-first pixel P11 disposed in the non-display area NA are not present. In this case, in the first area UPA of each of the first-first pixel P11 and the first-second pixel P12, an auxiliary pixel driving electrode APDE which has a different length and a different shape from that of the general common electrode CE and pixel electrode PE may be disposed. The plurality of common electrodes CE and the plurality of pixel electrodes PE according to the exemplary embodiment of the present disclosure may be referred to as pixel driving electrodes PDE and include a main pixel driving electrode MPDE and an auxiliary pixel driving electrode APDE having a different length from that of the main pixel driving electrode MPDE.

The main pixel driving electrode MPDE refers to a pixel driving electrode which is disposed in a general display device and may be disposed in both the first-second pixel P12 and the first-third pixel P13. The main pixel driving electrode MPDE may have a bent portion similarly to the corresponding data line DL. In this case, the position of the bent portion may be the same as the position of the bent portion of the corresponding data line DL. For example, in the first-third pixel P13 in which only main pixel driving electrodes MPDE are disposed, the pixel electrodes PE and the common electrodes CE disposed in the first-third pixel P13 have the bent portions in the same position as the bent portion of the third data line DL3 and have the same length. However, the position of the bent portion of the main pixel driving electrode MPDE including the pixel electrode PE and the common electrode CE disposed in the first-first pixel P11 disposed at an outermost periphery of the first row may be different from those of other pixels. When the adjacent first-second pixel P12 includes the auxiliary pixel driving electrode APDE, the bent portion of the pixel driving electrode of the first-first pixel P11 may be disposed in the same position as the second data line DL2.

In the meantime, the auxiliary pixel driving electrode APDE may be disposed in the first-first pixel P11 and the first-second pixel P12. That is, the auxiliary pixel driving electrode APDE may be disposed in pixels where the first area UPA and the second area BPA have different widths, among the plurality of pixels. In other words, in the first-first pixel P11 and the first-second pixel P12, both the main pixel driving electrode MPDE and the auxiliary pixel driving electrode APDE may be disposed. More specifically, the auxiliary pixel driving electrode APDE may be disposed in the first area UPA having a larger width, between the first area UPA and the second BPA. Even though the main pixel driving electrode MPDE is disposed to be the same as the data line connected to each pixel, the auxiliary pixel driving electrode APDE is not the same as the data line. That is, the main pixel driving electrode MPDE is disposed to have the bent portion in the same position as the bent portion disposed in the data line DL, but the auxiliary pixel electrode APDE may be disposed so as not to have the bent portion. As described above, in addition to the main pixel driving electrode MPDE which is disposed to be the same as the data line connected to the first-first pixel P11 and the first-second pixel P12, an auxiliary pixel driving electrode APDE for filling an area having different width is disposed so that the opening area, that is, an emission area may be.

As can be seen viewing FIG. 5, the area occupied by pixel P12 is smaller than the area occupied by P13, which is standard size pixel. The bending point BP2 is higher than the MBP, resulting in a smaller pixel. Nearly all portions of the pixel P12 are smaller than P13, including various parts of the TFT, such as the GE and SE, as well. The MPDE is also smaller, having a smaller area.

As can also be seen viewing FIG. 5, the area occupied by pixel P11 is smaller than the area occupied by P12. The bending point BP1 is higher than the bendig point BP2 also higher than MBP, resulting in a yet smaller pixel. The total area of the pixel P11 is therefore smaller than P12 and P13 and thus leaves more room for non-display circuit elements.

Figure 6:
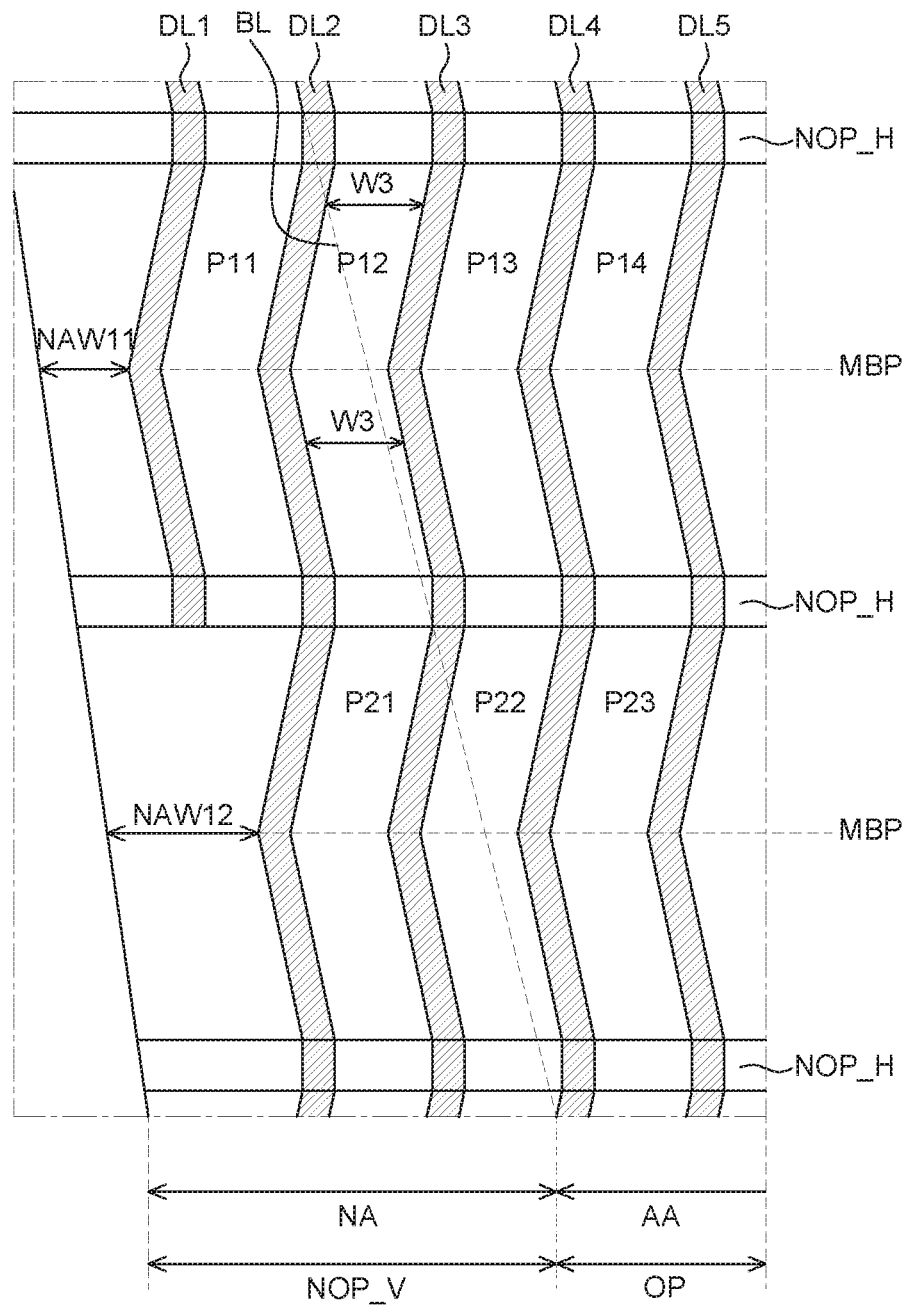
FIG. 6 is a plan view illustrating a comparative example of a display device according to an exemplary embodiment of the present disclosure.

FIG. 6 is a plan view illustrating a comparative example of a display device according to an exemplary embodiment of the present disclosure.

Referring to FIG. 6, in a general display device, all pixels disposed at an outermost periphery, that is, in the non-display area NA and the display area AA, may have the same width and thus the pixels may be disposed with the same area. Therefore, an opening area OP and a vertical non-opening area NOP_V may be defined by a boundary line BL which defines the display area AA and the non-display area NA. That is, the area of the display area AA and the area of the opening area OP are the same and the area of the non-display area NA and the area of the vertical non-opening area NOP_V are the same. Therefore, in a general display device, when the boundary line BL which defines the display area AA and the non-display area NA is disposed an oblique direction, an area of the non-display area NA where an anti-static element or signal lines are disposed is limited.

In contrast, referring to FIG. 4, in the display device 100 according to the exemplary embodiment of the present disclosure, pixels disposed at the outermost periphery, that is, in the non-display area NA, for example, the first-first pixel P11 and the second-first pixel P21 are disposed to have different areas from the pixels disposed in the display area AA. Therefore, an area in the non-display area NA where the driving elements are disposed may be increased. That is, it is understood that a first width NAW1 of the non-display area NA of the first row of the display device 100 according to the exemplary embodiment of the present disclosure illustrated in FIG. 4 is larger than a first width NAW11 of the non-display area NA of the first row of the general display device illustrated in FIG. 6.

Further, in the display device 100 according to the exemplary embodiment of the present disclosure, the pixels disposed in the non-display area NA have a different area from that of the pixels disposed in the display area AA so that the upper area and the lower area have different widths. In this case, the auxiliary pixel driving electrode which has a different length or a different shape from that of the pixel electrode and the common electrode disposed in the pixel is disposed in the area having a larger width so that the opening area OP may be increased. That is, the opening area OP of the general display device illustrated in FIG. 6 has the same area as the display area AA. In contrast, the opening area OP of the display device 100 according to the exemplary embodiment of the present disclosure illustrated in FIG. 4 may be disposed to be broader than the display area AA. Therefore, as compared with the general display device illustrated in FIG. 6, the display device 100 according to the exemplary embodiment of the present disclosure may ensure a larger opening area OP.

Further, in the display device 100 according to the exemplary embodiment of the present disclosure, the pixel disposed in the non-display area NA has a different area from the pixel disposed in the display area AA so that the upper area and the lower area may have different widths. By doing this, in order to improve the arrangement of the pixel electrodes and the common electrodes, the bent portion of the data line disposed in the non-display area NA and the bent portion of the data line disposed in the display area AA are disposed in different positions, so that even though upper and lower widths of the pixels disposed in the non-display area NA, that is, the areas are different, the location and area of pixel electrodes PE and the common electrodes CE may be improved to provide more room.

The exemplary embodiments of the present disclosure can also be described as follows:

According to an aspect of the present disclosure, a display device may comprise a substrate which includes a display area including a first pixel and a non-display area including a second pixel, a first data line which is disposed on the substrate and applies a data signal to the first pixel, a second data line which is disposed on the substrate and applies a data signal to the second pixel and a gate line which is disposed on the substrate and applies gate signals to the first pixel and the second pixel at the same timing, wherein the first pixel and the second pixel have different area from each other.

The first pixel and the second pixel may include a plurality of pixel electrodes and a plurality of common electrodes, and the plurality of pixel electrodes and the plurality of common electrodes disposed in the second pixel may have different lengths and shapes from the plurality of pixel electrodes and the plurality of common electrodes disposed in the first pixel.

The first data line may include at least one first bent portion and the second data line may include at least one second bent portion, and the first bent portion and the second bent portion are bent in different positions.

The first bent portion may be disposed to be lower than the second bent portion.

The second pixel may include a first area and a second area defined with respect to the first bent portion and the width of the first area and the width of the second area are different from each other.

The pixel electrodes and the common electrodes which have different lengths and shapes from the plurality of pixel electrodes and the plurality of common electrodes disposed in the first pixel may be disposed in an area having a larger width between the first area and the second area of the second pixel.

The display device may further include a boundary line which defines the display area and the non-display area on the substrate, and wherein the boundary line extends in an oblique direction.

According to an another aspect of the present disclosure, a display device may comprise a substrate in which a boundary line defining a display area and a non-display area surrounding the display area, a first pixel in the display area, a bent portion defined at a center portion of the first pixel and a second pixel in the non-display area, wherein the second pixel includes an upper area and a lower area which are defined with respect to the bent portion and the upper area and the lower area of the second pixel have different widths.

The second pixel may be disposed a pixel driving electrode for driving the pixel and the number of the pixel driving electrodes disposed in the upper area of the second pixel is different from the number of pixel driving electrodes disposed in the lower area of the second pixel.

The pixel driving electrode may include a main pixel driving electrode and an auxiliary pixel driving electrode.

The auxiliary driving electrode may be disposed in one area which is larger than the other, between the upper area and the lower area of the second pixel.

The display device may further comprise a third pixel which overlaps the boundary line and wherein the third pixel is disposed between the first pixel and the second pixel.

The third pixel may have a different area from areas of the first pixel and the second pixel.

The third pixel may include an upper area and a lower area which are defined with respect to the bent portion and the upper area and the lower area of the third pixel have different widths.

The first pixel may include an area from which a part of the pixel driving electrode is not present.

Although the aspects of the present disclosure have been described in detail with reference to the accompanying drawings, it is to be understood that the present disclosure is not limited to those described aspects and various changes and modifications may be made without departing from the scope of the present disclosure. Therefore, the aspects disclosed in the present disclosure are not intended to limit the technical scope of the present disclosure, but to illustrate them. Thus, the technical scope of the present disclosure is not limited by these aspects. It should be understood that the above-described aspects are merely illustrative in all aspects and not restrictive. The scope of the present disclosure should be construed only by the appended claims, and all technical features within the scope of equivalents should be construed as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
    a substrate which includes a display area and a non-display area;
    a first pixel positioned fully in the display area, the first pixel occupying a first area;
    a second pixel positioned at least partially in a non-display area, the second pixel occupying a second area smaller than the first area;
    a first data line which is disposed on the substrate and coupled to apply a data signal to the first pixel;
    a second data line which is disposed on the substrate and coupled to apply a data signal to the second pixel; and
    a gate line which is disposed on the substrate and coupled to apply gate signals to the first pixel and the second pixel at the same time,
    wherein the second pixel includes pixel driving electrodes for driving the second pixel,
    wherein the first data line includes at least one first bent portion and the second data line includes at least one second bent portion,
    wherein the second pixel includes a first area and a second area defined with respect to the first bent portion, and
    wherein a width of the first area and a width of the second area with respect to the first bent portion are different from each other.

2. The display device according to claim 1,
    wherein the first pixel includes pixel driving electrodes for driving the first pixel,
    wherein the pixel driving electrodes of the first pixel and the second pixel include a plurality of pixel electrodes and a plurality of common electrodes, and
    wherein the plurality of pixel electrodes and the plurality of common electrodes disposed in the second pixel have different lengths and shapes from the plurality of pixel electrodes and the plurality of common electrodes disposed in the first pixel.

3. The display device according to claim 2, wherein the first bent portion and the second bent portion are bent in different respective bending points along respective length.

4. The display device according to claim 3, wherein the bending points includes a first bending point of the first bent portion and a second bending point of the second bent portion, and wherein the first bending point is disposed lower than the second bending point.

5. The display device according to claim 1, wherein the pixel electrodes and the common electrodes which have different lengths and shapes from the plurality of pixel electrodes and the plurality of common electrodes disposed in the first pixel are disposed in an area having a larger width between the first area and the second area of the second pixel.

6. The display device according to claim 1, further comprising: a boundary line which defines the display area and the non-display area on the substrate, wherein the boundary line extends in an oblique direction.

7. The display device according to claim 1, wherein the entire second pixel is in the non-display area.

8. The display device according to claim 1, wherein a first portion of the second pixel is in the display area and a second portion of the second pixel is in the non-display area.

9. The display device according to claim 1, wherein the number of the pixel driving electrodes disposed in an upper area of the second pixel is different from the number of pixel driving electrodes disposed in a lower area of the second pixel.

10. A display device, comprising:
    a substrate having a boundary line defining a display area and a non-display area adjacent to the display area;
    a first pixel in the display area;
    a first bending point positioned at a center portion of the first pixel;
    a second pixel having portions thereof in the non-display area; and
    a second bending point positioned in an upper region of the second pixel, the second pixel having an upper area above the first bending point and a lower area below the first bending point,
    wherein the upper area and the lower area of the second pixel have different widths from each other, and
    wherein the second pixel includes pixel driving electrodes for driving the second pixel and the number of the pixel driving electrodes disposed in the upper area of the second pixel is different from the number of pixel driving electrodes disposed in the lower area of the second pixel.

11. The display device according to claim 10, wherein the pixel driving electrodes include main pixel driving electrodes and auxiliary pixel driving electrodes.

12. The display device according to claim 11, wherein the auxiliary driving electrodes are disposed in one area which is larger than the other, between the upper area and the lower area of the second pixel.

13. The display device according to claim 10, further comprising:
    a third pixel which overlaps the boundary line, wherein the third pixel is disposed between the first pixel and the second pixel.

14. The display device according to claim 13, wherein the third pixel has a different area from areas of the first pixel and the second pixel.

15. The display device according to claim 14, wherein the third pixel includes an upper area and a lower area which are defined with respect a third bending point and the upper area and the lower area of the third pixel have different widths.

16. The display device according to claim 10, wherein the first pixel includes an area from which a part of the pixel driving electrodes are not present.

17. The display device according to claim 10, further including a data line in the first pixel and a data line in the second pixel, wherein the first bending point of the data line in the first pixel is located in a center region of the data line and the second bending point of the data line in the second pixel is located in an upper region of the data line.

\* \* \* \* \*